US010377654B2

(12) United States Patent
Tarcza

(10) Patent No.: US 10,377,654 B2
(45) Date of Patent: Aug. 13, 2019

(54) APPARATUS AND METHOD OF MANUFACTURING COMPOSITE GLASS ARTICLES

(71) Applicant: CORNING INCORPORATED, Corning, NY (US)

(72) Inventor: Steven Howard Tarcza, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 16/116,254

(22) Filed: Aug. 29, 2018

(65) Prior Publication Data
US 2019/0016621 A1 Jan. 17, 2019

Related U.S. Application Data

(62) Division of application No. 15/305,915, filed as application No. PCT/US2015/027229 on Apr. 23, 2015, now Pat. No. 10,112,862.
(Continued)

(51) Int. Cl.
*C03B 17/02* (2006.01)
*C03B 17/06* (2006.01)
(Continued)

(52) U.S. Cl.
CPC .............. *C03B 17/02* (2013.01); *C03B 15/10* (2013.01); *C03B 17/064* (2013.01); *C03B 18/12* (2013.01); *C03C 3/091* (2013.01); *C03C 3/095* (2013.01)

(58) Field of Classification Search
CPC ....... C03B 17/02; C03B 15/10; C03B 17/064; C03B 18/12; C03C 3/095; C03C 3/091
(Continued)

(56) References Cited

U.S. PATENT DOCUMENTS 2,026,287 A 12/1935 Stenhouse
3,338,696 A 8/1967 Dockerty
(Continued)

FOREIGN PATENT DOCUMENTS

CN 101555092 A 10/2009
CN 203212449 U 9/2013
(Continued)

OTHER PUBLICATIONS

English Translation of CN201580021820.1 First Office Action dated Aug. 2, 2018, China Patent Office.
(Continued)

*Primary Examiner* — Nahida Sultana
(74) *Attorney, Agent, or Firm* — Svetlana Z. Short; Michael A. Hood

(57) ABSTRACT

A method includes supplying a conjoined molten glass stream to an overflow distributor. A cross section of the conjoined molten glass stream includes a first cross sectional portion and a second cross sectional portion. The first cross sectional portion includes a first glass composition. The second cross sectional portion includes a second glass composition different than the first glass composition. The first glass composition is flowed over a first transverse segment of a weir of the overflow distributor. The second glass composition is flowed over a second transverse segment of the weir of the overflow distributor.

16 Claims, 11 Drawing Sheets

Related U.S. Application Data

(60) Provisional application No. 61/984,380, filed on Apr. 25, 2014.

(51) Int. Cl.
    *C03B 15/10*     (2006.01)
    *C03B 18/12*     (2006.01)
    *C03C 3/091*     (2006.01)
    *C03C 3/095*     (2006.01)

(58) Field of Classification Search
    USPC ....... 425/130, 133.5; 65/145, 121, 129, 195, 65/324, 90
    See application file for complete search history.

(56) References Cited

U.S. PATENT DOCUMENTS

| | | | |
|---|---|---|---|
| 3,737,294 A | 6/1973 | Dumbaugh, Jr. | |
| 3,746,526 A | 7/1973 | Giffon | |
| 3,849,097 A | 11/1974 | Giffen et al. | |
| 3,931,438 A | 1/1976 | Beall et al. | |
| 4,102,664 A | 7/1978 | Dumbaugh, Jr. | |
| 4,214,886 A | 7/1980 | Shay et al. | |
| 4,525,194 A | 6/1985 | Rudoi | |
| 5,342,426 A | 8/1994 | Dumbaugh, Jr. | |
| 5,559,060 A | 9/1996 | Dumbaugh, Jr. et al. | |
| 6,997,017 B2 | 2/2006 | Pitbladdo | |
| 7,201,965 B2 | 4/2007 | Gulati et al. | |
| 7,386,999 B2 | 6/2008 | Fenn et al. | |
| 7,475,568 B2 | 1/2009 | Bookbinder et al. | |
| 7,514,149 B2 | 4/2009 | Bocko et al. | |
| 7,681,414 B2 | 3/2010 | Pitbladdo | |
| 8,007,913 B2 | 8/2011 | Coppola et al. | |
| 8,393,177 B2 | 3/2013 | Boratav et al. | |
| 9,485,044 B2* | 11/2016 | Luoma | H04H 60/25 |
| 9,758,418 B1* | 9/2017 | El-Kahlout | C03B 17/064 |
| 9,908,803 B2 | 3/2018 | Bookbinder et al. | |
| 2004/0197575 A1 | 10/2004 | Bocko et al. | |
| 2008/0202165 A1* | 8/2008 | Hoysan | C03B 17/064 |
| | | | 65/90 |
| 2009/0162545 A1* | 6/2009 | Bocko | B32B 17/06 |
| | | | 427/209 |
| 2010/0167059 A1 | 7/2010 | Hashimoto et al. | |
| 2010/0212359 A1 | 8/2010 | Godard et al. | |
| 2010/0251774 A1 | 10/2010 | Peterson | |
| 2011/0045239 A1 | 2/2011 | Takaya et al. | |
| 2012/0103019 A1* | 5/2012 | Milillo | C03B 7/02 |
| | | | 65/53 |
| 2012/0135171 A1* | 5/2012 | Swenson | B29C 45/0053 |
| | | | 428/35.7 |
| 2012/0227445 A1 | 9/2012 | Citti et al. | |
| 2012/0266632 A1 | 10/2012 | Pitbladdo | |
| 2013/0133371 A1* | 5/2013 | Burdette | C03B 17/068 |
| | | | 65/91 |
| 2013/0312459 A1 | 11/2013 | Coppola et al. | |
| 2014/0272222 A1* | 9/2014 | Swenson | B29C 45/0046 |
| | | | 428/35.7 |
| 2015/0114041 A1 | 4/2015 | Capek et al. | |
| 2015/0191387 A1 | 7/2015 | Bisson et al. | |
| 2017/0044041 A1 | 2/2017 | Godard et al. | |
| 2017/0174564 A1 | 6/2017 | Cleary et al. | |
| 2017/0210662 A1 | 7/2017 | Wagner et al. | |
| 2017/0226007 A1 | 8/2017 | Garner et al. | |
| 2017/0240460 A1 | 8/2017 | Boek et al. | |
| 2018/0127302 A1* | 5/2018 | Gross | C03C 3/083 |
| 2018/0297884 A1* | 10/2018 | Aburada | C03B 17/064 |

FOREIGN PATENT DOCUMENTS

| | | |
|---|---|---|
| GB | 2163740 A | 8/1984 |
| WO | 2014009766 A2 | 1/2014 |
| WO | 2014055837 A2 | 4/2014 |

OTHER PUBLICATIONS

International Search Report and Written Opinion of the International Searching Authority; PCT/US2015/027229; dated Aug. 5, 2015; 13 Pages; European Patent Office.

English Translation of TW104113079 Search Report dated Aug. 13, 2018, Taiwan Patent Office.

* cited by examiner

APPARATUS AND METHOD OF MANUFACTURING COMPOSITE GLASS ARTICLES

This application is a divisional of U.S. application Ser. No. 15/305,915 filed Oct. 21, 2016, which claims the benefit of priority under 35 U.S.C. § 371 of International Application No. PCT/US2015/027229 filed Apr. 23, 2015, which claims the benefit of priority to U.S. Application No. 61/984,380 filed Apr. 25, 2014, the content of each of which is incorporated herein by reference in its entirety.

BACKGROUND

1. Field

This disclosure relates to glass sheets, and more particularly to composite glass sheets comprising a plurality of regions of different glass compositions and methods for forming the same.

2. Technical Background

A glass sheet can be formed using a variety of different processes. The glass sheet can be severed to separate a glass pane therefrom. The glass pane can be processed further (e.g., during a cutting or molding process) to form a glass article.

SUMMARY

Disclosed herein are composite glass sheets and systems and method for forming the same.

Disclosed herein is a method comprising supplying a conjoined molten glass stream to an overflow distributor. A cross-section of the conjoined molten glass stream comprises a first cross-sectional portion and a second cross-sectional portion. The first cross-sectional portion comprises a first glass composition. The second cross-sectional portion comprises a second glass composition different than the first glass composition. The first glass composition is flowed over a first transverse segment of a weir of the overflow distributor. The second glass composition is flowed over a second transverse segment of the weir of the overflow distributor.

Also disclosed herein is a method comprising supplying a first glass composition to a first flow channel of a divided delivery tube, and supplying a second glass composition to a second flow channel of the divided delivery tube. The first glass composition and the second glass composition are merged at an exit of the divided delivery tube to form a conjoined molten glass stream. The conjoined molten glass stream is supplied to an overflow distributor.

Also disclosed herein is a method comprising supplying a first glass composition and a second glass composition to a divided delivery tube comprising a plurality of flow channels. Each of the first glass composition and the second glass composition is flowed down a forming surface of an overflow distributor to form a glass sheet comprising the first glass composition and the second glass composition. Each flow channel of the divided delivery tube corresponds to a determined region of the glass sheet disposed at a determined transverse position relative to a width of the glass sheet and a determined axial position relative to a thickness of the glass sheet.

Also disclosed herein is a system comprising a divided delivery tube and an overflow distributor. The divided delivery tube comprises a plurality of flow channels. The overflow distributor comprises a trough. The divided delivery tube is fluidly coupled to the trough of the overflow distributor.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate one or more embodiment(s), and together with the description serve to explain principles and operation of the various embodiments.

DETAILED DESCRIPTION

Figure 1:
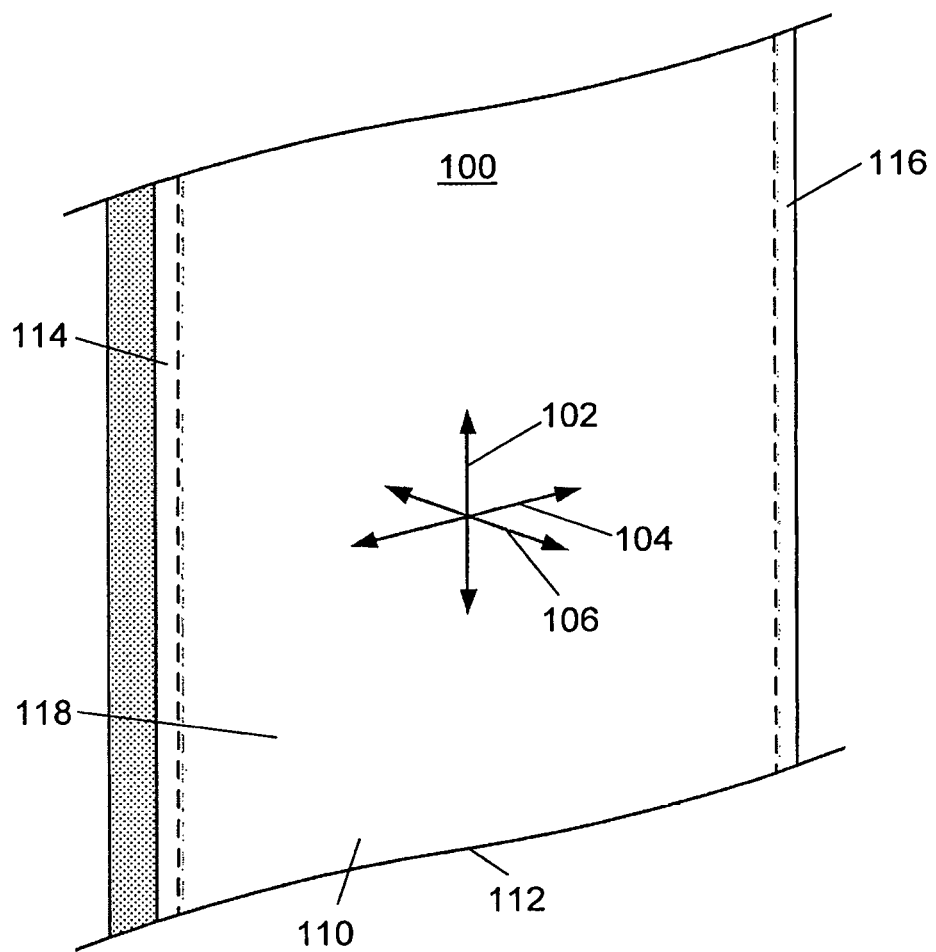
FIG. 1 is a partial perspective view of one exemplary embodiment of a glass sheet.

Reference will now be made in detail to exemplary embodiments which are illustrated in the accompanying drawings. Whenever possible, the same reference numerals will be used throughout the drawings to refer to the same or like parts. The components in the drawings are not necessarily to scale, emphasis instead being placed upon illustrating the principles of the exemplary embodiments.

As used herein, the term "average coefficient of thermal expansion" refers to the average coefficient of thermal expansion of a given material or region between 0° C. and 300° C. As used herein, the term "coefficient of thermal expansion" refers to the average coefficient of thermal expansion unless otherwise indicated.

In various embodiments described herein, a composite glass sheet comprises at least a first region and a second region. The first region comprises a first glass composition, and the second region comprises a second glass composition that is different than the first glass composition. Thus, the composite glass sheet comprises a segmented composite glass sheet comprising a plurality of regions of different glass compositions. For example, in some embodiments, the first region and/or the second region comprise one or more bands of the glass sheet. Each band comprises a determined transverse region and a determined axial region of the glass sheet and extends longitudinally along the glass sheet. In some embodiments, one of the first region or the second region comprises one or more bands, and the other of the first region or the second region comprises a matrix in which the bands are disposed. For example, the matrix comprises a core on which bands are disposed and/or a clad in which one or more bands are disposed. In various embodiments described herein, the first region and/or the second region are glass regions comprising a glass, a glass-ceramic, or a combination thereof. In some embodiments, the first region and/or the second region comprise transparent glass regions. Additionally, or alternatively, the first glass composition and/or the second glass composition comprise a glass, a glass-ceramic, or a combination thereof. In some embodiments, the first glass composition and/or the second glass composition comprise transparent glass compositions.

In various embodiments described herein, a glass manufacturing system comprises a plurality of melting systems, a delivery system, and a forming unit. Each of the plurality of melting systems forms a molten glass composition. The delivery system delivers the molten glass compositions from the plurality of melting systems to the forming unit. The forming unit forms a glass sheet (e.g., a composite glass sheet) comprising the glass compositions. In some embodiments, the glass manufacturing system comprises a pull roll assembly for drawing the glass sheet from the forming unit and/or a glass sheet separation device for severing the glass sheet to separate a glass pane from the glass sheet.

FIG. 1 is a partial perspective view of one exemplary embodiment of a glass sheet 100. Glass sheet 100 comprises a length extending in a longitudinal direction (e.g., an upward or downward direction) as shown by arrow 102, a width extending in a transverse direction (e.g., a side-to-side direction) as shown by arrow 104, and a thickness extending in an axial direction (e.g., a forward or backward direction) as shown by arrow 106. In some embodiments, the transverse direction is substantially perpendicular to the longitudinal direction. Additionally, or alternatively, the axial direction is substantially perpendicular to each of the longitudinal direction and the transverse direction. A position of any region within glass sheet 100 can be defined by a longitudinal position, a transverse position, and/or an axial position of the region. In some embodiments, glass sheet 100 comprises a composite glass sheet. Thus, glass sheet 100 comprises a plurality of regions of different glass compositions as described herein. The position of each of the plurality of regions can be defined by the longitudinal position, the transverse position, and/or the axial position of the region. For example, a position of a band extending longitudinally along glass sheet 100 can be defined by a transverse position and an axial position of the band.

Glass sheet 100 comprises a first surface 110 and a second surface 112 opposite the first surface. A first edge zone 114 extends longitudinally along the length of glass sheet 100 adjacent to a first side edge of the glass sheet. A second edge zone 116 extends longitudinally along the length of glass sheet 100 adjacent to a second side edge of the glass sheet opposite the first side edge. A central zone 118 of glass sheet 100 is disposed between first edge zone 114 and second edge zone 116. In some embodiments, central zone 118 is thinner than first edge zone 114 and/or second edge zone 116. For example, first edge zone 114 and/or second edge zone 116 comprise beads extending longitudinally along glass sheet 100. The beads can be relatively thick regions formed near the side edges of glass sheet 100. In some embodiments, the beads are thicker than central zone 118 of glass sheet 100.

Figure 2:
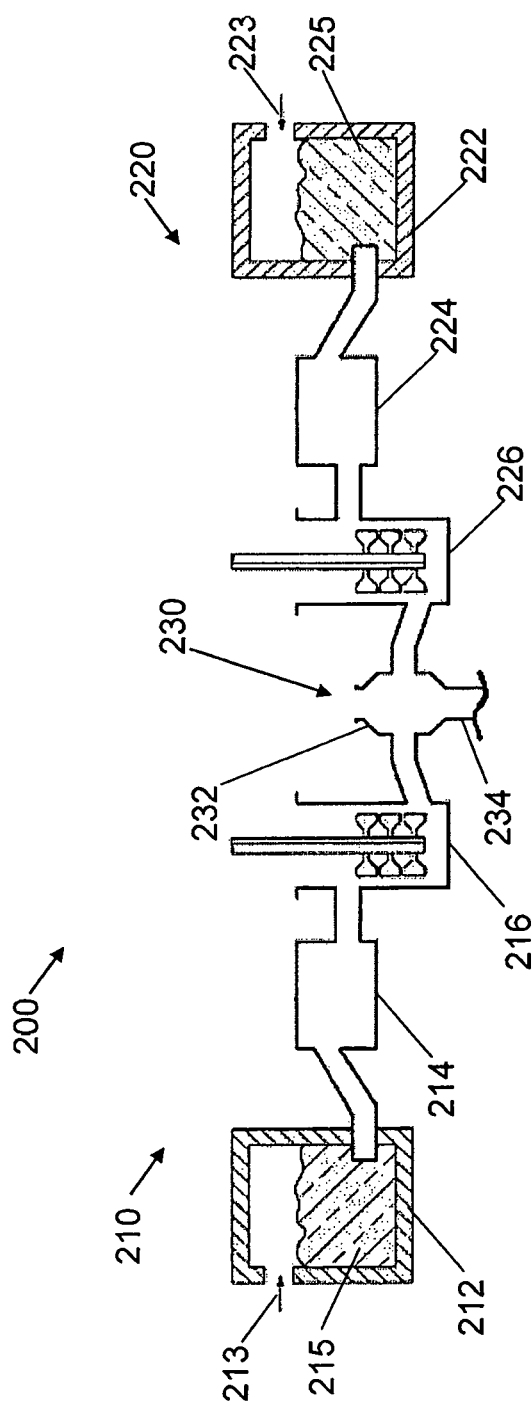
FIG. 2 is a schematic illustration of a portion of one exemplary glass manufacturing system.
Figure 3:
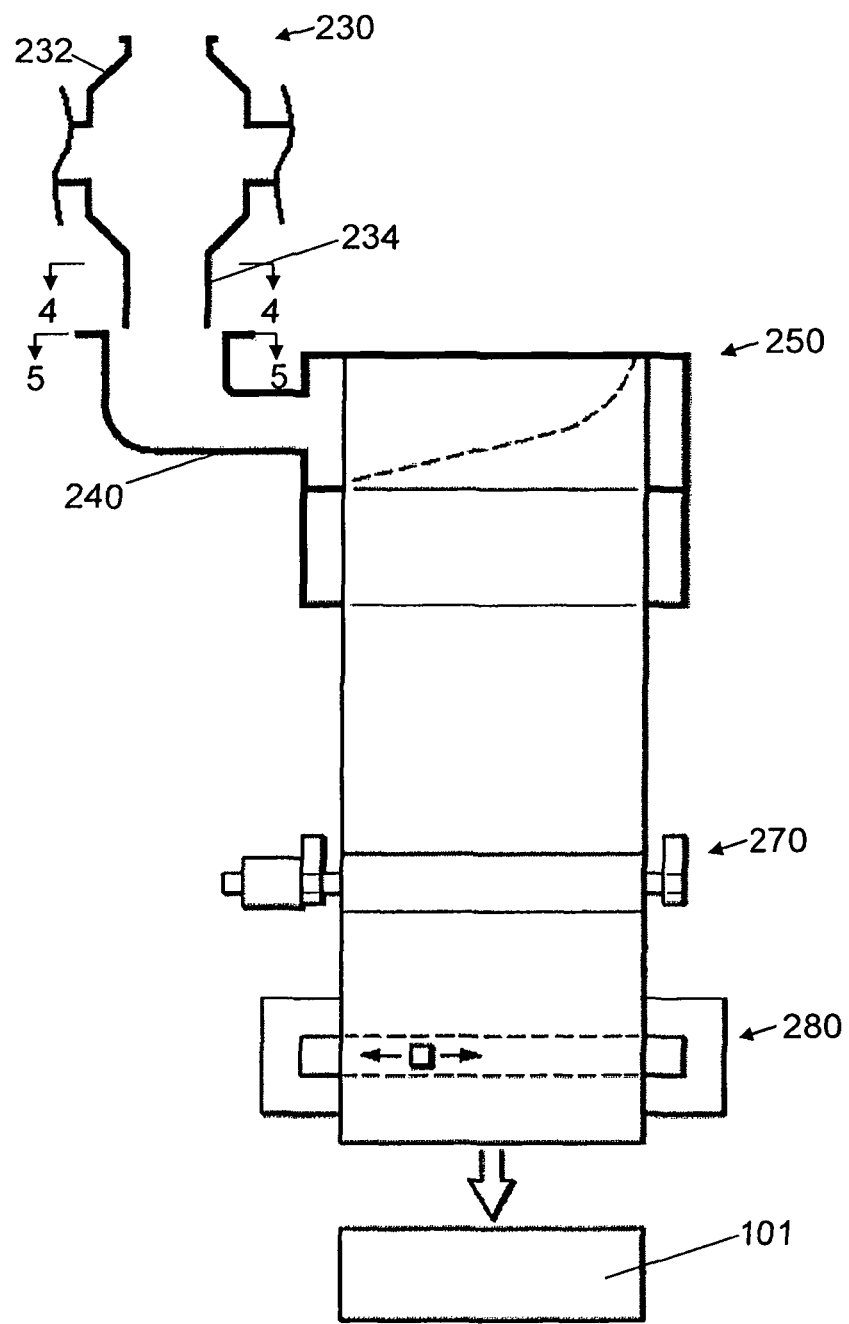
FIG. 3 is a schematic illustration of another portion of the glass manufacturing system of FIG. 2.

Glass sheet 100 can be formed using a suitable forming process such as, for example, a fusion draw, down draw, slot draw, up draw, or float process. FIGS. 2 and 3 are schematic illustrations of front-end and back-end portions, respectively, of one exemplary embodiment of a glass manufacturing system 200 that can be used to manufacture a glass sheet (e.g., glass sheet 100) using a fusion draw process as described herein. As shown in FIG. 2, glass manufacturing system 200 comprises at least a first melting system 210 and a second melting system 220. First melting system 210 comprises a melting vessel 212. In some embodiments, first melting system 210 comprises a fining vessel 214, which can be fluidly coupled to melting vessel 212. Additionally, or alternatively, first melting system 210 comprises a mixing vessel 216 (e.g., a stir chamber), which can be fluidly coupled to fining vessel 214. Similarly, second melting system 220 comprises a melting vessel 222, a fining vessel 224, and/or a mixing vessel 226. The components of second melting system 220 are arranged as described herein with respect to first melting system 210.

Each of first melting system 210 and second melting system 220 is fluidly coupled to a delivery system 230 as shown in FIG. 2. Delivery system 230 delivers molten glass from each of first melting system 210 and second melting system 220 to a forming unit 250 to form the glass sheet as shown in FIG. 3 and described herein. In the embodiment shown in FIGS. 2-3, delivery system 230 comprises a delivery vessel 232 (e.g., a bowl). Delivery system 230 comprises a delivery tube 234 (e.g., a downcomer), which can be fluidly coupled to delivery vessel 232. In some embodiments, delivery tube 234 is configured as a divided delivery tube as described herein. Delivery system 230 comprises an inlet tube 240, which is fluidly coupled to delivery tube 234. For example, delivery tube 234 is fluidly coupled to forming unit 250 via inlet tube 240 as shown in FIG. 3. In some embodiments, inlet tube 240 is configured as an undivided inlet tube as described herein.

In some embodiments, the fining vessel, the mixing vessel, and/or the delivery vessel are made from materials comprising platinum or platinum-containing metals such as, for example, platinum-rhodium, platinum-iridium, and combinations thereof. Additionally, or alternatively, the fining vessel, the mixing vessel, and/or the delivery vessel comprise other refractory materials such as, for example, molybdenum, palladium, rhenium, tantalum, titanium, tungsten, alloys thereof, zirconia, alumina, or combinations thereof. In some embodiments, the forming unit is made from materials comprising zircon.

Glass batch materials are introduced into melting vessel 212 as shown by arrow 213 and melted to form a molten first glass composition 215 as shown in FIG. 2. In some embodiments, molten first glass composition 215 is transferred to fining vessel 214 via a transfer tube. Bubbles can be removed from molten first glass composition 215 within fining vessel 214. Additionally, or alternatively, molten first glass composition 215 is transferred to mixing vessel 216 via a transfer tube. Molten first glass composition 215 can be mixed within mixing vessel 216 to homogenize the first glass composition. Additionally, or alternatively, molten first glass composition 215 is transferred to delivery system 230 via a transfer tube. Molten first glass composition 215 is delivered to forming unit 250 via delivery system 230 as described herein.

Similarly, glass batch materials are introduced into melting vessel 222 as shown by arrow 223 and melted to form a molten second glass composition 225 as shown in FIG. 2. In some embodiments, molten second glass composition 225 is transferred to fining vessel 224 via a transfer tube. Bubbles can be removed from molten second glass composition 225 within fining vessel 224. Additionally, or alternatively, molten second glass composition 225 is transferred to mixing vessel 226 via a transfer tube. Molten second glass composition 225 can be mixed within mixing vessel 226 to homogenize the second glass composition. Additionally, or alternatively, molten second glass composition 225 is transferred to delivery system 230 via a transfer tube. Molten second glass composition 225 is delivered to forming unit 250 via delivery system 230 as described herein.

Delivery system 230 is fluidly coupled to forming unit 250 as shown in FIG. 3 to deliver molten first glass composition 215 and molten second glass composition 225 to the forming unit. In some embodiments, molten first glass composition 215 and molten second glass composition 225 are merged within delivery system 230 to form a conjoined molten glass stream as described herein. The conjoined molten glass stream can be delivered to forming unit 250 to form glass sheet 100.

Figure 4:
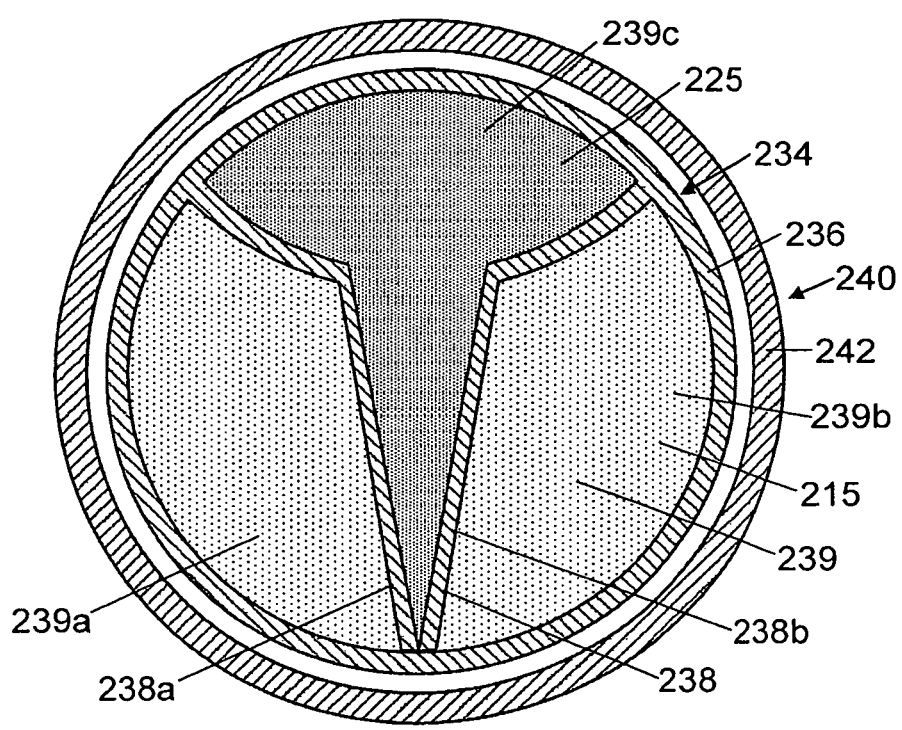
FIG. 4 is a cross-sectional view of one exemplary embodiment of a delivery tube comprising a plurality of flow channels with molten glass compositions therein.
Figure 5:
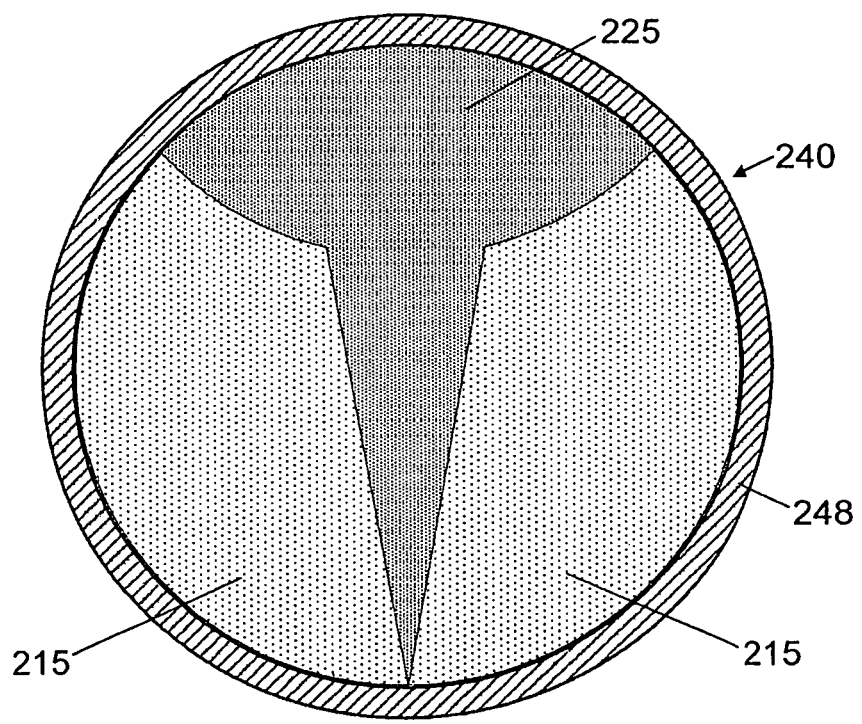
FIG. 5 is a cross-sectional view of one exemplary embodiment of an inlet tube with a conjoined molten glass stream therein.

FIGS. 4 and 5 are cross-sectional views taken along lines 4-4 and 5-5, respectively, of FIG. 3. Using modeling, it is possible to correlate a location in delivery tube 234 to a corresponding location in glass sheet 100. In other words, it is possible to determine where the molten glass disposed at a particular location in delivery tube 234 will end up in glass sheet 100. The cross-section of delivery tube 234 can be subdivided conceptually into a plurality of subsections. For example, a grid can be superimposed conceptually over the cross-section of delivery tube 234 to subdivide the delivery tube into an array of squares and/or other polygonal or non-polygonal shapes. The molten glass disposed in each subsection of the cross-section of delivery tube 234 will end up at a determined location in glass sheet 100 (e.g., a determined transverse position and a determined axial position). Thus, different glass compositions can be delivered to different subsections of the cross-section of delivery tube 234 such that glass sheet 100 comprises different regions comprising the different glass compositions.

In some embodiments, delivery tube 234 comprises a divided delivery tube. For example, delivery tube 234 comprises an outer wall 236 and one or more dividing walls 238 that divide a lumen of the delivery tube into a plurality of flow channels 239 as shown in FIG. 4. Each flow channel 239 of delivery tube 234 corresponds to a determined region of glass sheet 100 disposed at a determined transverse position relative to the width of the glass sheet and a determined axial position relative to the thickness of the glass sheet. Different glass compositions can be delivered to different flow channels 239 of delivery tube 234 so that different regions of glass sheet 100 disposed at different transverse and axial positions comprise the different glass compositions as described herein.

In some embodiments, inlet tube 240 comprises an undivided inlet tube as shown in FIG. 5. For example, inlet tube 240 comprises an outer wall 248 and a lumen within the outer wall. The different glass compositions flow from delivery tube 234 into inlet tube 240. Upon exiting the plurality of flow channels 239 of delivery tube 234, the different glass compositions merge to form a conjoined molten glass stream within inlet tube 240. Thus, the different glass compositions are merged at an exit of delivery tube 234 to form the conjoined molten glass stream. The conjoined molten glass stream comprises the multiple glass compositions in direct contact with one another. Although the different glass compositions of the conjoined molten glass stream are not separated by dividing walls, the different glass compositions remain in substantially discrete regions of the conjoined molten glass stream (e.g., due to substantially laminar and/or plug flow of the molten glass through the delivery tube and the inlet tube). In other words, except for limited mixing or diffusion at interfaces between the different glass compositions, the different glass compositions remain substantially separate from one another in the conjoined molten glass stream as shown in FIG. 5.

Figure 6:
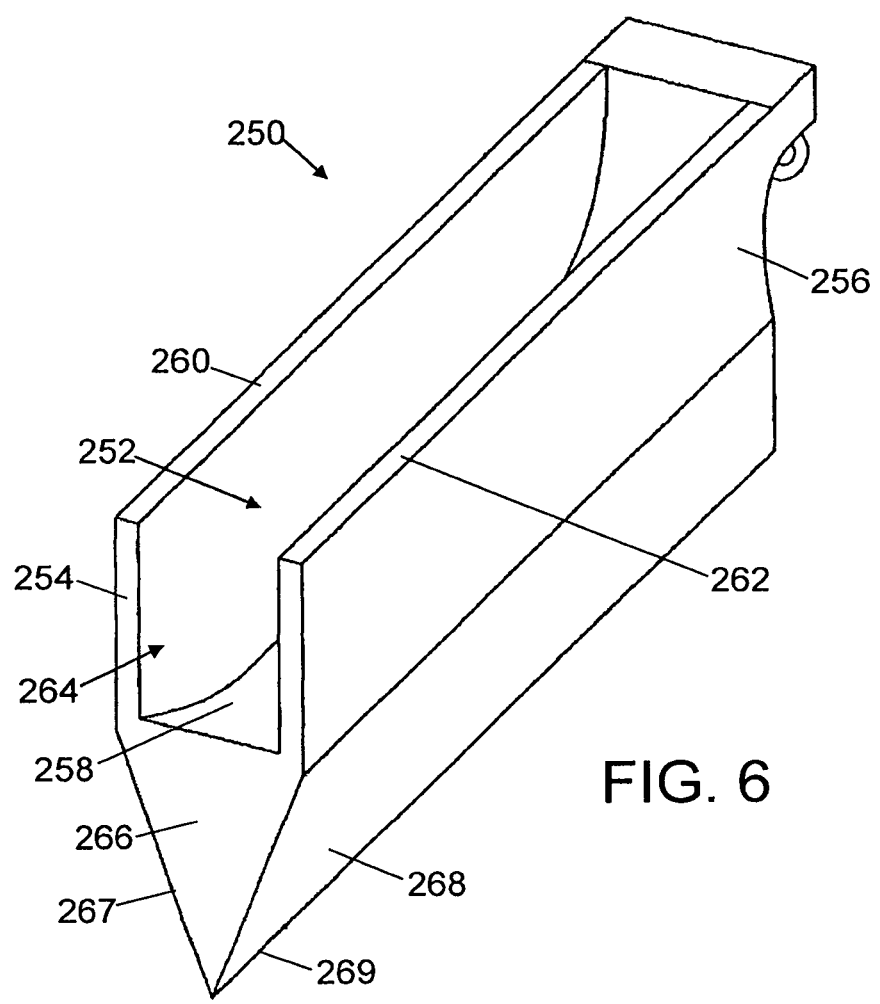
FIG. 6 is a perspective view of one exemplary embodiment of a forming unit.
Figure 7:
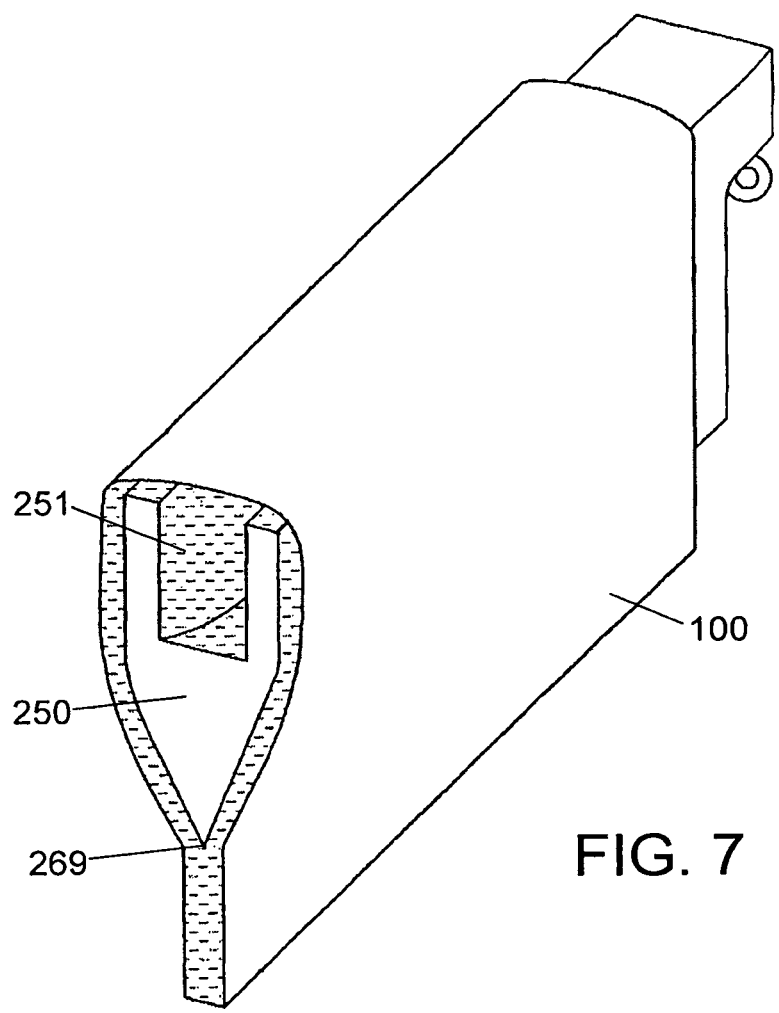
FIG. 7 is a perspective view of one exemplary embodiment of a molten glass stream flowing over the forming unit of FIG. 6 to form a glass sheet.

FIG. 6 is a perspective view of one exemplary embodiment of forming unit 250, and FIG. 7 is a perspective view of glass sheet 100 being formed on the forming unit. In some embodiments, forming unit 250 is configured as an overflow distributor that can be used to form glass sheet 100 using a fusion draw process. Forming unit 250 can be configured as described in U.S. Pat. No. 3,338,696, which is incorporated by reference herein in its entirety. For example, forming unit 250 comprises a trough 252 bounded by opposing first and second sidewalls 254 and 256 and a bottom surface 258. An upper edge of first sidewall 254 comprises a first weir 260. Additionally, or alternatively, an upper edge of second sidewall 256 comprises a second weir 262. Molten glass can flow over first weir 260 and/or second weir 262 to form glass sheet 100 as described herein. In some embodiments, bottom surface 258 is contoured such that a height of trough 252 decreases in the transverse direction away from an inlet 264 of forming unit 250 as shown in FIG. 6. Inlet tube 240 can be coupled to inlet 264 of trough 252 for delivery of molten glass to forming unit 250 as described herein. Forming unit 250 further comprises a forming body 266 positioned beneath trough 252. Forming body 266 comprises opposing first and second outer forming surfaces 267 and 268 that converge at a draw line 269.

As shown in FIG. 7, molten glass 251 is fed into trough 252. Molten glass 251 overflows trough 252 and flows over first and second weirs 260 and 262 and down first and second outer forming surfaces 267 and 268. The stream of molten glass 251 flowing down first outer forming surface 267 and the stream of the molten glass flowing down second outer forming surface 268 converge at draw line 269 where they are fused together to form glass sheet 100. In some embodiments, molten glass 251 comprises regions of different glass compositions. For example, molten glass 251 comprises the different glass compositions delivered to forming unit 250 as the conjoined molten glass stream. Thus, glass sheet 100 comprises regions of different glass compositions as described herein.

Glass sheet 100 can comprise a glass ribbon traveling longitudinally away from forming unit 250 as shown in FIG. 7. Because outer surfaces of glass sheet 100 do not contact first and second outer forming surfaces 267 and 268 of forming unit 250, the glass sheet can comprise pristine outer surfaces of fire-polished surface quality. In some embodiments, different glass compositions flow over different transverse segments of first weir 260 and/or second weir 262 such that glass sheet 100 comprises a composite glass sheet as described herein.

Forming unit 250 can be pivotally adjustable such that first weir 260 and/or second weir 262 have a desired tilt angle with respect to a horizontal. Forming unit 250 can be pivotally adjustable by a suitable adjustment mechanism including, for example, a roller, a wedge, a cam, or combinations thereof. A tilt angle of first weir 260 and/or second weir 262, a rate at which molten glass 251 is supplied to trough 252, and/or a viscosity of the molten glass can be selected such that a sheet-like flow of molten glass having a uniform thickness is formed at draw line 269.

In some embodiments, pull roll assembly 270 is positioned longitudinally downstream of forming unit 250 as shown in FIG. 3. Pull roll assembly 270 comprises a plurality of rolling members. Glass sheet 100 can be drawn between opposing rolling members as the glass sheet moves longitudinally away from forming unit 250. The rolling members can extend across a portion or substantially the entire width of glass sheet 100. For example, in some embodiments, pull roll assembly 270 comprises a first pair of pulling rollers engageable with first edge zone 114 of glass sheet 100. Additionally, or alternatively, pull roll assembly 170 comprises a second pair of pulling rollers engageable with second edge zone 116 of glass sheet 100. Thus, the pulling rollers can engage first edge zone 114 and/or second edge zone 116 of glass sheet 100 without engaging central zone 118 of the glass sheet. Avoiding contact with central zone 118 can aid in preventing damage (e.g., surface roughness, scratches, and/or chips) to the central zone of glass sheet 100. Engagement of glass sheet 100 by pull roll assembly 270 can aid in controlling the thickness of the glass sheet.

In some embodiments, glass sheet separation device 280 is positioned longitudinally downstream of forming unit 250 and/or pull roll assembly 270 as shown in FIG. 3. Glass sheet separation device 280 severs glass sheet 100 to separate a glass pane 101 from the glass sheet. Glass sheet separation device 280 can comprise a suitable severing device including, for example, a score wheel, a blade, a laser, a torch, a heating and/or cooling element, a support and/or breaking bar, a compression nosing, or combinations thereof. Glass sheet separation device 280 can sever glass sheet 100 using a suitable technique such as, for example, scoring, bending, thermally shocking, ablating, melting, fracturing, laser cutting, shearing, ultrasonic breaking, or combinations thereof.

The arrangement of the regions of different glass compositions within glass sheet 100 can depend on the configurations of delivery tube 234, inlet tube 240, and/or forming unit 250. For example, in the embodiment shown in FIG. 4, delivery tube 234 comprises a first dividing wall 238a and a second dividing wall 238b that divide the lumen of the delivery tube into a first flow channel 239a (bounded by outer wall 236 and first dividing wall 238a), a second flow channel 239b (bounded by outer wall 236 and second dividing wall 238b), and a third flow channel 239c (bounded by outer wall 236, first dividing wall 238a, and second dividing wall 238b). The cross-sectional shape of third flow channel 239c comprises an almond-shaped (i.e., resembling an ellipse with pointed ends) portion with a wedge-shaped portion extending therefrom as shown in FIG. 4. Third flow channel 239c extends across delivery tube 234, and first flow channel 239a and second flow channel 239b are disposed on opposing sides of the third flow channel. In some embodiments, first molten glass composition 215 is delivered to each of first flow channel 239a and second flow channel 239b. Additionally, or alternatively, second molten glass composition 225 is delivered to third flow channel 239c.

Upon exiting delivery tube 234, first molten glass composition 215 and second molten glass composition 225 merge to form the conjoined molten glass stream. A cross-section of the conjoined molten glass stream comprises at least a first cross-sectional portion and a second cross-sectional portion. The first cross-sectional portion comprises first molten glass composition 215, and the second cross-sectional portion comprises second molten glass composition 225. The shapes of the first and second cross-sectional portions of the conjoined molten glass stream correspond to the shapes of flow channels 239 of delivery tube 234. For example, in the embodiment shown in FIG. 5, the shape of the first cross-sectional portion comprising first glass composition 215 corresponds to the shapes of first flow channel 239a and second flow channel 239b, and the shape of the second cross-sectional portion comprising second glass composition 225 corresponds to the shape of third flow channel 239c.

In some embodiments, a temperature of at least one of first glass composition 215 or second glass composition 225 is adjusted (e.g., in first melting system 210, second melting system 220, or delivery system 230). For example, the temperature of the glass composition is adjusted to control a ratio of a viscosity of first glass composition 215 in the conjoined molten glass stream (e.g., at the exit of delivery tube 234) to a viscosity of second glass composition 225 in the conjoined molten glass stream (e.g., at the exit of the delivery tube). Additionally, or alternatively, the temperature of the glass composition is adjusted to control a ratio of a density of first glass composition 215 in the conjoined molten glass stream to a density of second glass composition 225 in the conjoined molten glass stream. The temperature of the glass composition can be adjusted using a suitable thermal adjustment unit including, for example, a heated and/or cooled fluid stream (e.g., air or water), a laser, a radiator, an induction heater (e.g., a microwave heater), or combinations thereof. Additionally, or alternatively, the temperature of the first glass composition or the second glass composition can be adjusted by adjusting the relative, flow rates of the glass compositions. Controlling the viscosity ratio and/or the density ratio in the conjoined molten glass stream can aid in maintaining the shapes of the different cross-sectional portions of the conjoined molten glass stream to form a glass sheet having a desired configuration. In some embodiments, the glass compositions can be selected to achieve a desired viscosity ratio and/or density ratio in the conjoined molten glass stream, in addition to or instead of adjusting the temperature of one or more of the glass compositions.

The viscosity ratio comprises the ratio of the viscosity of first glass composition 215 in the conjoined molten glass stream to the viscosity of second glass composition 225 in the conjoined molten glass stream. In some embodiments, the viscosity ratio is at least about 0.5, at least about 0.6, or at least about 0.7. Additionally, or alternatively, the viscosity ratio is at most about 1.7, at most about 1.6, or at most about 1.5. The density ratio comprises the ratio of the density of first glass composition 215 in the conjoined molten glass stream to the density of second glass composition 225 in the conjoined molten glass stream. In some embodiments, the density ratio is at least about 0.8, at least about 0.9, or at least about 1. Additionally, or alternatively, the density ratio is at most about 1.4, at most about 1.3, or at most about 1.2. In embodiments comprising an interior region (e.g., a core) and an exterior region (e.g., a clad), the glass composition of the interior region (e.g., the first glass composition) can have a greater density than the glass composition of the exterior region (e.g., the second glass composition). This can reduce the tendency of the glass composition of the interior region from sinking into the glass composition of the exterior region as the conjoined molten glass stream flows to and/or through the trough as described herein. Additionally, or alternatively, the viscosity of the glass composition of the exterior region can be increased to reduce the tendency of the glass composition of the interior region from sinking into the glass composition of the exterior region as the conjoined molten glass stream flows to and/or through the trough.

In some embodiments, first melting system 210 and second melting system 220 are sized according to the areas of the first cross-sectional portion and the second cross-sectional portion of the conjoined molten glass stream. For example, a ratio of a size or capacity of first melting system 210 to a size or capacity of second melting system 220 is substantially equal to a ratio of an area of the first cross-sectional portion comprising first molten glass composition 215 to an area of the second cross-sectional portion comprising second molten glass composition 225. Thus, the melting systems can be configured to supply the molten glass compositions in the proper proportions for forming the conjoined molten glass stream.

The conjoined molten glass stream is delivered to trough 252 of forming unit 250 and flows over at least one weir of the forming unit. The shapes of the different portions of the conjoined molten glass stream comprising the different glass compositions change as the conjoined molten glass stream flows through inlet tube 240 and/or trough 252. For example, in some embodiments, inlet tube 240 comprises a transition in which the cross-sectional shape of the inlet tube transitions from substantially circular (as shown in FIG. 5) to a non-circular shape (e.g., similar to the inlet of the trough). The conjoined molten glass stream can deform as the conjoined molten glass stream flows through the transition of inlet tube 240. Additionally, or alternatively, the conjoined molten glass stream deforms as the conjoined molten glass stream flows through trough 252 away from the inlet of the trough. The deformation of the conjoined molten glass stream is taken into account in determining where the different glass compositions will end up in glass sheet 100. Thus, the configuration of the conjoined molten glass stream at the exit of delivery tube 234 and/or within inlet tube 240 is selected to achieve a desired configuration of the conjoined molten glass stream flowing over first weir 260 and/or second weir 262 of forming unit 250 and, in turn, a desired configuration of the different regions of glass sheet 100 comprising the different glass compositions.

Figure 8:
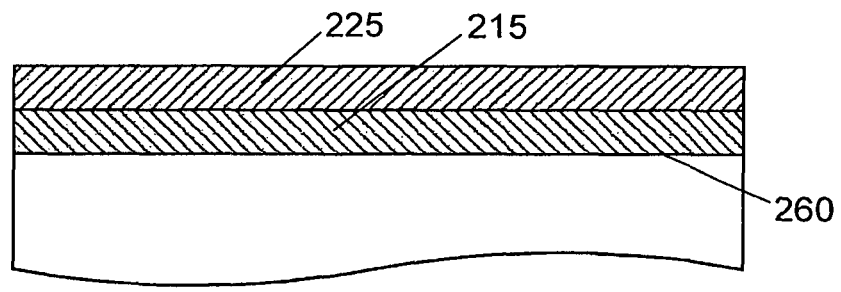
FIG. 8 is a partial cross-sectional view of one exemplary embodiment of a molten glass stream flowing over a weir of the forming unit of FIG. 6.

Each of first glass composition 215 and second glass composition 225 flows over at least a portion of the weir to form glass sheet 100. For example, FIG. 8 is a partial cross-sectional view of forming unit 250, taken along first weir 260, with the conjoined molten glass stream shown in FIG. 5 (after deforming within inlet tube 240 and/or trough 252) flowing over the first weir. First glass composition 215 flows over a first transverse segment of first weir 260. Second glass composition 225 flows over a second transverse segment of first weir 260. The first transverse segment and the second transverse segment overlap one another at an overlap segment. In the embodiment shown in FIG. 8, each of the first transverse segment and the second transverse segment comprises substantially the entire effective width of first weir 260. Thus, the overlap segment comprises substantially the entire effective width of first weir 260. Second glass composition 225 flows over first glass composition 215 at the overlap segment (e.g., as a result of the shapes of the first cross-sectional portion and the second cross-sectional portion of the conjoined molten glass stream). The conjoined molten glass stream flows down an outer forming surface of forming unit 250. For example, each of first glass composition 215 and second glass composition 225 flows down first outer forming surface 267. Second glass composition 225 flowing down first outer forming surface 267 is spaced from the outer forming surface by first glass composition 215 (e.g., because the second glass composition flows over the first glass composition).

In some embodiments, the conjoined molten glass stream flows over second weir 262. For example, first glass composition 215 flows over a first transverse segment of second weir 262, and second glass composition 225 flows over a second transverse segment of second weir 262. The first transverse segment and the second transverse segment overlap one another at an overlap segment as described with reference to the flow over first weir 260. In some embodiments, the first transverse segment of second weir 262 corresponds to the first transverse segment of first weir 260. In other words, the first transverse segment of first weir 260 and the first transverse segment of second weir 262 are aligned such that, when formed into glass sheet 100, the portions of the conjoined molten glass stream that flowed over the first transverse segments of first and second weirs 260 and 262 are aligned with one another (e.g., disposed at substantially the same transverse positions) in the glass sheet. Additionally, or alternatively, the second transverse segment and/or the overlap segment of second weir 262 correspond to the second transverse segment and/or the overlap segment, respectively, of first weir 260. Each of first glass composition 215 and second glass composition 225 flows down second outer forming surface 268. The separate streams of the conjoined molten glass stream flowing down opposing first and second outer forming surfaces 267 and 268 are joined at draw line 269 to form glass sheet 100. In some embodiments, glass sheet 100 is symmetrical about a transverse axis thereof as a result of the corresponding flows over first weir 260 and second weir 262.

Figure 9:
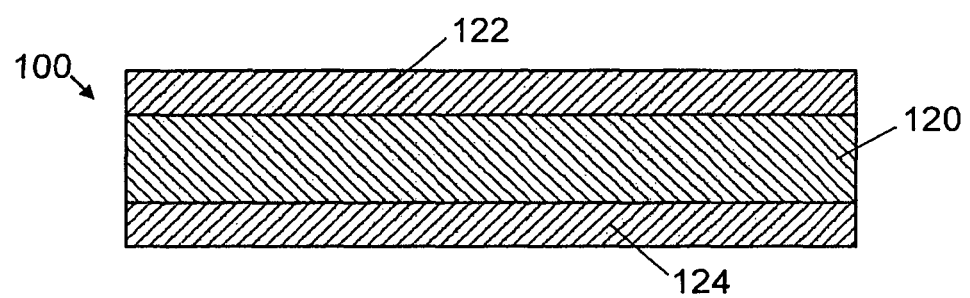
FIG. 9 is a transverse cross-sectional view of one exemplary embodiment of a glass sheet formed by the molten glass stream of FIG. 8.

FIG. 9 is a transverse cross-sectional view of one exemplary embodiment of glass sheet 100 formed by flowing the conjoined molten glass stream shown in FIG. 5 over each of first weir 260 (as shown in FIG. 8) and second weir 262 of forming unit 250. In the embodiment shown in FIG. 9, glass sheet 100 comprises a laminated sheet comprising a plurality of glass layers. Glass sheet 100 comprises a core band 120 disposed between a first cladding band 122 and a second cladding band 124. Each of core band 120, first cladding band 122, and second cladding band 124 extends transversely across substantially the entire width of glass sheet 100. Thus, each of core band 120, first cladding band 122, and second cladding band 124 comprises a glass layer of the laminated sheet. Core band 120 comprises first glass composition 215. Each of first cladding band 122 and second cladding band 124 comprises the second glass composition 225. Core band 120 comprises a first major surface and a second major surface opposite the first major surface. In some embodiments, first cladding band 122 is fused to the first major surface of core band 120. Additionally, or alternatively, second cladding band 124 is fused to the second major surface of core band 120. In such embodiments, the interfaces between first cladding band 122 and core band 120 and/or between second cladding band 124 and core band 120 are free of any bonding material such as, for example, an adhesive, a coating layer, or any non-glass material added or configured to adhere the respective cladding bands to the core band. Thus, first cladding band 122 and/or second cladding band 124 are fused directly to core band 120 or are directly adjacent to the core band.

In other embodiments, the shapes of the different regions of the conjoined molten glass stream can be modified (e.g., by changing the configuration of delivery tube 234) to form a glass article comprising one or more glass bands disposed at determined transverse and axial regions of the glass sheet.

Figure 10:
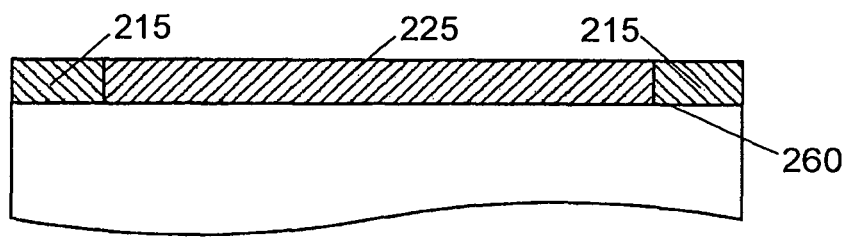
FIG. 10 is a partial cross-sectional view of another exemplary embodiment of a molten glass stream flowing over a weir of the forming unit of FIG. 6.

FIG. 10 is a partial cross-sectional view of forming unit 250, taken along first weir 260, with another embodiment of the conjoined molten glass stream flowing over the first weir. First glass composition 215 flows over a first transverse segment of first weir 260, and second glass composition 225 flows over a second transverse segment of the first weir. In the embodiment shown in FIG. 10, each of the first transverse segment and the second transverse segment comprises less than the entire effective width of first weir 260. For example, the first transverse segment comprises an end segment of first weir 260, and the second transverse segment comprises a central segment of the first weir adjacent to the end segment. Thus, there is substantially no overlap between the first transverse segment and the second transverse segment of first weir 260. In some embodiments, the end segment of first weir 260 comprises a first end segment and a second end segment, and the central segment is disposed between the first end segment and the second end segment as shown in FIG. 10. The conjoined molten glass stream flows down an outer forming surface of forming unit 250. For example, each of first glass composition 215 and second glass composition 225 flows down first outer forming surface 267. In some embodiments, the conjoined molten glass stream flows over second weir 262 in a manner similar to that described with reference to the flow over first weir 260. Each of first glass composition 215 and second glass composition 225 flows down second outer forming surface 268, and the separate streams of the conjoined molten glass stream flowing down opposing first and second outer forming surfaces 267 and 268 are joined at draw line 269 to form another exemplary embodiment of a glass sheet 100a.

Figure 11:
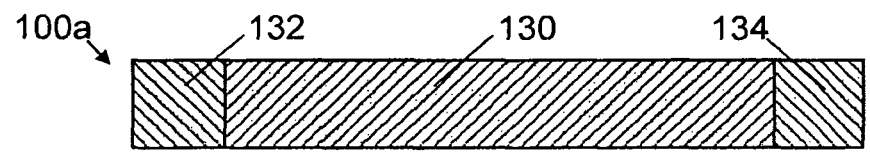
FIG. 11 is a transverse cross-sectional view of another exemplary embodiment of a glass sheet formed by the molten glass stream of FIG. 10.

FIG. 11 is a transverse cross-sectional view of glass sheet 100a formed by flowing the conjoined molten glass stream over each of first weir 260 (as shown in FIG. 10) and second weir 262 of forming unit 250. In the embodiment shown in FIG. 11, glass sheet 100a comprises a plurality of glass bands. Each glass band occupies a discrete transverse region of glass sheet 100a and extends longitudinally along the glass sheet. In some embodiments, each glass band occupies substantially the entire thickness of glass sheet 100a as shown in FIG. 10. In other embodiments, one or more glass bands can occupy less than the entire thickness of the glass sheet. Glass sheet 100a comprises a central band 130 disposed between a first edge band 132 and a second edge band 134. In some embodiments, each of first edge band 132 and second edge band 134 comprises first glass composition 215 and central band 130 comprises second glass composition 225. Thus, each of first surface 110 and second surface 112 of glass sheet 100a comprises second glass composition 225 along central zone 118 and first glass composition 215 along each of first edge zone 114 and second edge zone 116. Central band 130 comprises a first edge surface and a second edge surface opposite the first edge surface. In some embodiments, first edge band 132 is fused to the first edge surface of central band 130. Additionally, or alternatively, second edge band 134 is fused to the second edge surface of central band 130.

Figure 12:
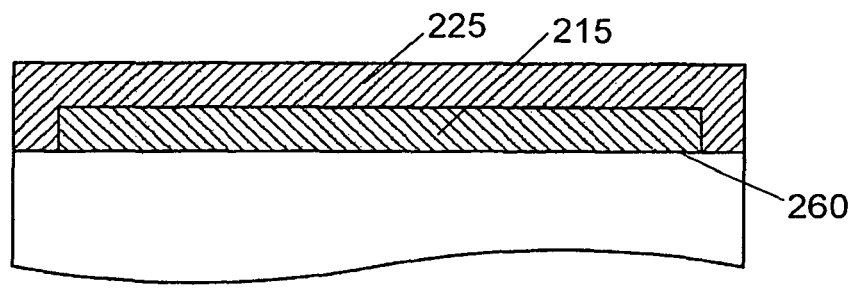
FIG. 12 is a partial cross-sectional view of another exemplary embodiment of a molten glass stream flowing over a weir of the forming unit of FIG. 6.

FIG. 12 is a partial cross-sectional view of forming unit 250, taken along first weir 260, with another embodiment of the conjoined molten glass stream flowing over the first weir. First glass composition 215 flows over a first transverse segment of first weir 260, and second glass composition 225 flows over a second transverse segment of the first weir. The first transverse segment and the second transverse segment overlap one another at an overlap segment. In the embodiment shown in FIG. 12, the first transverse segment comprises less than the entire effective width of first weir 260, and the second transverse segment comprises substantially the entire effective width of the first weir. For example, the overlap segment comprises a central segment of first weir 260. The second transverse segment of first weir 260 comprises a first end segment, a second end segment, and the central segment disposed between the first end segment and the second end segment as shown in FIG. 12. The conjoined molten glass stream flows down an outer forming surface of forming unit 250. For example, each of first glass composition 215 and second glass composition 225 flows down first outer forming surface 267. In some embodiments, the conjoined molten glass stream flows over second weir 262 in a manner similar to that described with reference to the flow over first weir 260. Each of first glass composition 215 and second glass composition 225 flows down second outer forming surface 268, and the separate streams of the conjoined molten glass stream flowing down opposing first and second outer forming surfaces 267 and 268 are joined at draw line 269 to form another exemplary embodiment of a glass sheet 100b.

Figure 13:
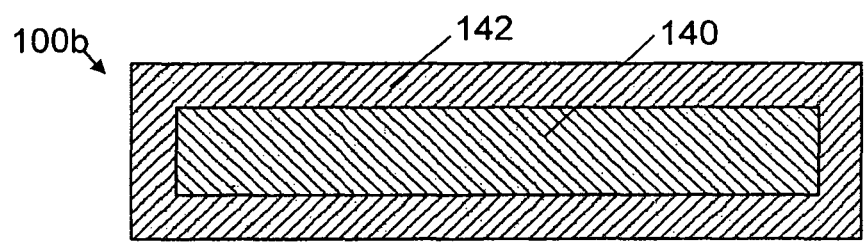
FIG. 13 is a transverse cross-sectional view of another exemplary embodiment of a glass sheet formed by the molten glass stream of FIG. 12.

FIG. 13 is a transverse cross-sectional view of glass sheet 100b formed by flowing the conjoined molten glass stream over each of first weir 260 (as shown in FIG. 12) and second weir 262 of forming unit 250. In the embodiment shown in FIG. 13, glass sheet 100b comprises a glass band. The glass band occupies a discrete transverse and axial region of glass sheet 100b and extends longitudinally along the glass sheet. In some embodiments, the glass band occupies less than the entire thickness of glass sheet 100b as shown in FIG. 13. In other embodiments, one or more glass bands can occupy substantially the entire thickness of the glass sheet. Glass sheet 100b comprises a central band 140 and a cladding 142 disposed about the central band. Central band 140 comprises first glass composition 215. Cladding 142 comprises second glass composition 225. In some embodiments, central band 140 is substantially enveloped within cladding 142. Thus, central band 140 is substantially unexposed, which can aid in protecting the central band (e.g., in embodiments in which the central band is under tension) or avoiding contact with the central band (e.g., to avoid migration of components of first glass composition 215 out of the central band or migration of external components into the central band). Enveloping the central band within the cladding can enable use of a relatively soft glass composition for the central band (e.g., because the soft glass composition is protected by the cladding). Additionally, or alternatively, central band 140 is fused to cladding 142. For example, cladding 142 is fused to a first major surface, a second major surface, a first edge surface, and a second edge surface of central band 140.

Figure 14:
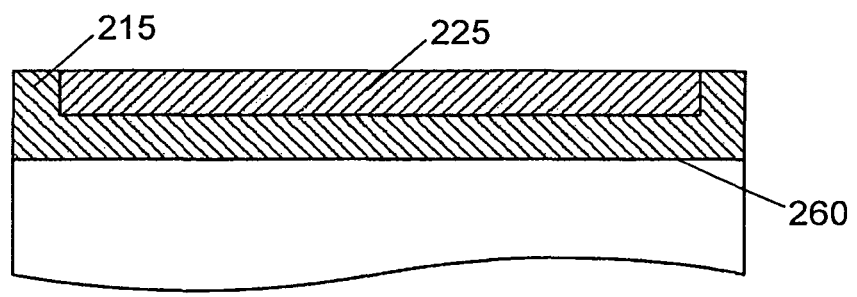
FIG. 14 is a partial cross-sectional view of another exemplary embodiment of a molten glass stream flowing over a weir of the forming unit of FIG. 6.

FIG. 14 is a partial cross-sectional view of forming unit 250, taken along first weir 260, with another embodiment of the conjoined molten glass stream flowing over the first weir. First glass composition 215 flows over a first transverse segment of first weir 260, and second glass composition 225 flows over a second transverse segment of the first weir. The first transverse segment and the second transverse segment overlap one another at an overlap segment. In the embodiment shown in FIG. 14, the first transverse segment comprises substantially the entire effective width of first weir 260, and the second transverse segment comprises less than the entire effective width of the first weir. For example, the overlap segment comprises a central segment of first weir 260. Thus, the first transverse segment of first weir 260 comprises a first end segment, a second end segment, and the central segment disposed between the first end segment and the second end segment as shown in FIG. 14. The conjoined molten glass stream flows down an outer forming surface of forming unit 250. For example, each of first glass composition 215 and second glass composition 225 flows down first outer forming surface 267. In some embodiments, the conjoined molten glass stream flows over second weir 262 in a manner similar to that described with reference to the flow over first weir 260. Each of first glass composition 215 and second glass composition 225 flows down second outer forming surface 268, and the separate streams of the conjoined molten glass stream flowing down opposing first and second outer forming surfaces 267 and 268 are joined at draw line 269 to form another exemplary embodiment of a glass sheet 100c.

Figure 15:
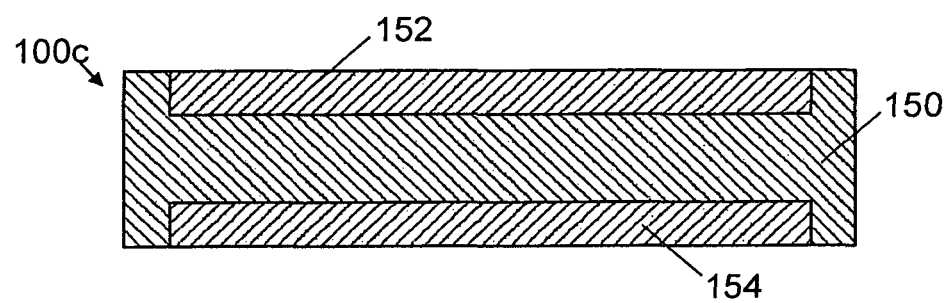
FIG. 15 is a transverse cross-sectional view of another exemplary embodiment of a glass sheet formed by the molten glass stream of FIG. 14.

FIG. 15 is a transverse cross-sectional view of glass sheet 100c formed by flowing the conjoined molten glass stream over each of first weir 260 (as shown in FIG. 14) and second weir 262 of forming unit 250. In the embodiment shown in FIG. 15, glass sheet 100c comprises a plurality of glass bands. Each glass band occupies a discrete transverse and axial region of glass sheet 100c and extends longitudinally along the glass sheet. In some embodiments, each glass band occupies less than the entire thickness of glass sheet 100c as shown in FIG. 15. In other embodiments, one or more glass bands can occupy substantially the entire thickness of the glass sheet. Glass sheet 100c comprises a core 150, a first band 152 adjacent to the core, and a second band 154 adjacent to the core and opposite the first band. For example, in some embodiments, core 150 comprises an I-shaped cross-section, and each of first band 152 and second band 154 is disposed adjacent to the shaft of the I-shaped core between the base and the capital of the core as shown in FIG. 15. Core 150 comprises first glass composition 215. Each of first band 152 and second band 154 comprises second glass composition 225. Thus, each of first surface 110 and second surface 112 of glass sheet 100c comprises second glass composition 225 along central zone 118 and first glass composition 215 along each of first edge zone 114 and second edge zone 116. In the embodiment shown in FIG. 15, first band 152 and second band 154 are disposed at substantially the same transverse position and at different axial positions in glass sheet 100c. In other embodiments, the first band and the second band can be disposed at the different transverse positions and substantially the same axial position, or at different transverse and axial positions. In some embodiments, first band 152 and/or second band 154 are fused to core 150. For example, first band 152 is fused to a first major surface of core 150, and/or second band 154 is fused to a second major surface of the core.

In various embodiments, first glass composition 215 and/or second glass composition 225 comprise a liquidus viscosity suitable for forming the glass sheet using a fusion draw process as described herein. For example, first glass composition 215 comprises a liquidus viscosity of at least about 100 kP, at least about 200 kP, or at least about 300 kP. Additionally, or alternatively, first glass composition 215 comprises a liquidus viscosity of at most about 3000 kP, at most about 2500 kP, at most about 1000 kP, or at most about 800 kP. Additionally, or alternatively, second glass composition comprises a liquidus viscosity of at least about 50 kP, at least about 100 kP, or at least about 200 kP. Additionally, or alternatively, second glass composition 225 comprises a liquidus viscosity of at most about 3000 kP, at most about 2500 kP, at most about 1000 kP, or at most about 800 kP. First glass composition 215 can aid in carrying second glass composition 225 over forming unit 250 to form the glass sheet. Thus, second glass composition 215 can comprise a liquidus viscosity that is lower than generally considered suitable for forming a single layer sheet using a fusion draw process.

In various embodiments, a glass sheet can have suitable dimensions. For example, in some embodiments, the glass sheet comprises a thickness of at least about 0.05 mm, at least about 0.1 mm, at least about 0.2 mm, or at least about 0.3 mm. Additionally, or alternatively, the glass sheet comprises a thickness of at most about 3 mm, at most about 2 mm, at most about 1.5 mm, at most about 1 mm, at most about 0.7 mm, or at most about 0.5 mm. In some embodiments, a ratio of a thickness of an interior region of the glass sheet (e.g., core 120 of glass article 100 shown in FIG. 9, central band 140 of glass article 100b shown in FIG. 13, or core 150 of glass article 100c shown in FIG. 15) to a thickness of the glass sheet is at least about 0.8, at least about 0.85, at least about 0.9, or at least about 0.95. In some embodiments, a thickness of the interior region of the glass sheet is from about 0.01 mm to about 0.3 mm.

In various embodiments, a glass sheet can be configured as a strengthened glass sheet. For example, first glass composition 215 and second glass composition 225 comprise different coefficients of thermal expansion (CTE) such that a CTE mismatch exists between different regions of the glass sheet. In some embodiments, an exterior region of the glass sheet (e.g., first cladding band 122 and/or second cladding band 124 of glass article 100 shown in FIG. 9, cladding 142 of glass article 100b shown in FIG. 13, or first band 152 and/or second band 154 of glass article 100c shown in FIG. 15) is formed from a glass composition having a lower average CTE than an interior region of the glass sheet (e.g., core 120 of glass article 100 shown in FIG. 9, central band 140 of glass article 100b shown in FIG. 13, or core 150 of glass article 100c shown in FIG. 15). The CTE mismatch results in formation of compressive stress in the exterior region of the glass sheet and tensile stress in the interior region of the glass sheet upon cooling of the glass sheet.

In some embodiments, the average CTE of the interior region of the glass sheet and the average CTE of the exterior region of the glass sheet differ by at least about $5 \times 10^{-7}$ $°C.^{-1}$, at least about $15 \times 10^{-7}$ $°C.^{-1}$, or at least about $25 \times 10^{-7}$ $°C.^{-1}$. Additionally, or alternatively, the average CTE of the interior region of the glass sheet and the average CTE of the exterior region of the glass sheet differ by at most about $60 \times 10^{-7}$ $°C.^{-1}$, at most about $50 \times 10^{-7}$ $°C.^{-1}$, at most about $40 \times 10^{-7}$ $°C.^{-1}$, at most about $30 \times 10^{-7}$ $°C.^{-1}$, at most about $20 \times 10^{-7}$ $°C.^{-1}$, or at most about $10 \times 10^{-7}$ $°C.^{-1}$. For example, in some embodiments, the average CTE of the interior region of the glass sheet and the average CTE of the exterior region of the glass sheet differ by from about $5 \times 10^{-7}$ °C.$^{-1}$ to about $30 \times 10^{-7}$ °C.$^{-1}$ or from about $5 \times 10^{-7}$ °C.$^{-1}$ to about $20 \times 10^{-7}$ °C.$^{-1}$. In some embodiments, the second glass composition comprises an average CTE of at most about $40 \times 10^{-7}$ °C.$^{-1}$, or at most about $35 \times 10^{-7}$ °C.$^{-1}$. Additionally, or alternatively, the second glass composition comprises an average CTE of at least about $25 \times 10^{-7}$ °C.$^{-1}$, or at least about $30 \times 10^{-7}$ °C.$^{-1}$. Additionally, or alternatively, the first glass composition comprises an average CTE of at least about $40 \times 10^{-7}$ °C.$^{-1}$, at least about $50 \times 10^{-7}$ °C.$^{-1}$, or at least about $55 \times 10^{-7}$ °C.$^{-1}$. Additionally, or alternatively, the first glass composition comprises an average CTE of at most about $100 \times 10^{-7}$ °C.$^{-1}$, at most about $90 \times 10^{-7}$ °C.$^{-1}$, at most about $80 \times 10^{-7}$ °C.$^{-1}$, at most about $70 \times 10^{-7}$ °C.$^{-1}$, or at most about $60 \times 10^{-7}$ °C.$^{-1}$.

In some embodiments, the compressive stress of the exterior region of the glass sheet is at most about 800 MPa, at most about 500 MPa, at most about 300 MPa, at most about 200 MPa, at most about 150 MPa, at most about 100 MPa, at most about 50 MPa, or at most about 40 MPa. Additionally, or alternatively, the compressive stress of the exterior region of the glass sheet is at least about 10 MPa, at least about 20 MPa, at least about 30 MPa, at least about 50 MPa, or at least about 100 MPa.

In some embodiments, the glass sheet is substantially free of a CTE mismatch. For example, the average CTE of the interior region of the glass sheet and the average CTE of the exterior region of the glass sheet differ by at most about $5 \times 10^{-7}$ °C.$^{-1}$, at most about $3 \times 10^{-7}$ °C.$^{-1}$, at most about $2 \times 10^{-7}$ °C.$^{-1}$, or at most about $1 \times 10^{-7}$ °C.$^{-1}$.

In various embodiments, it can be beneficial for one or more surfaces of the glass sheet to comprise a different glass composition at edge zones of the glass sheet than at the central zone of the glass sheet (e.g., as shown in FIGS. 11 and 15). For example, the surface of the glass sheet at the edge zones can comprise a glass composition with a higher liquidus viscosity than the surface of the glass sheet at the central zone. This can aid in preventing devitrification along the edge zones during formation of the glass sheet, which can damage various components of the glass manufacturing system (e.g., pulling rollers) and/or change the geometry of the forming unit.

Although the bands described herein comprise a rectangular transverse cross-sectional shape, other embodiments are included in this disclosure. In other embodiments, the bands can comprise a suitable transverse cross-sectional shape including, for example, elliptical, triangular, or another polygonal or non-polygonal shape.

Although the glass sheets described herein comprise one, two, or three bands, other embodiments are included in this disclosure. In other embodiments, a glass sheet can comprise a determined number of bands, such as four or more. For example, a glass article comprising more than three bands can be formed by increasing the number of flow channels of the delivery tube and/or rearranging the flow channels within the delivery tube.

Although the glass sheets described herein comprise two glass compositions, other embodiments are included in this disclosure. In other embodiments, a glass sheet can comprise a determined number of bands comprising a determined number of glass compositions. For example, each band can comprise a different glass composition or multiple bands can comprise the same glass composition. Additionally, or alternatively, the different regions of the glass sheets can comprise different glass compositions than those described herein. For example, the regions described herein as comprising the first glass composition can comprise the second glass composition, and/or the regions described herein as comprising the second glass composition can comprise the first glass composition (i.e., the positions of the first and second glass compositions can be switched). In various embodiments, the glass manufacturing system can comprise a suitable number of melting systems to accommodate the determined number of glass compositions. Each melting system can supply a molten glass composition to the delivery system for delivery to the forming unit as described herein. The relative sizes of the melting systems can depend on the relative amounts of the glass compositions in the conjoined molten glass stream as described herein.

Although the glass sheets described herein are symmetrical about a transverse axis of the glass sheet, other embodiments are included in this disclosure. In other embodiments, the conjoined molten glass stream can be nonsymmetrical such that the flow over the first weir of the forming unit is different than the flow over the second weir of the forming unit. Additionally, or alternatively, the conjoined molten glass stream can be flowed over one weir of the forming unit (e.g., a single-sided overflow distributor) without also being flowed over another weir of the forming unit.

First glass composition 215 and second glass composition 225 can comprise suitable glass compositions capable of forming a glass sheet with a desired configuration as described herein.

In some embodiments, first glass composition 215 comprises a glass network former selected from the group consisting of $SiO_2$, $Al_2O_3$, $B_2O_3$, and combinations thereof. For example, the first glass composition comprises at least about 50 mol % $SiO_2$, at least about 55 mol % $SiO_2$, at least about 60 mol % $SiO_2$, or at least about 65 mol % $SiO_2$. Additionally, or alternatively, the first glass composition comprises at most about 80 mol % $SiO_2$, at most about 70 mol % $SiO_2$, at most about 68 mol % $SiO_2$, or at most about 60 mol % $SiO_2$. Additionally, or alternatively, the first glass composition comprises at least about 5 mol % $Al_2O_3$, at least about 9 mol % $Al_2O_3$, or at least about 12 mol % $Al_2O_3$. Additionally, or alternatively, the first glass composition comprises at most about 20 mol % $Al_2O_3$, at most about 17 mol % $Al_2O_3$, or at most about 11 mol % $Al_2O_3$. Additionally, or alternatively, the first glass composition comprises at least about 3 mol % $B_2O_3$, at least about 6 mol % $B_2O_3$, or at least about 7 mol % $B_2O_3$. Additionally, or alternatively, the first glass composition comprises at most about 11 mol % $B_2O_3$, at most about 8 mol % $B_2O_3$, or at most about 4 mol % $B_2O_3$.

In some embodiments, first glass composition 215 comprises an alkali metal oxide selected from the group consisting of $Li_2O$, $Na_2O$, $K_2O$, and combinations thereof. For example, the first glass composition comprises at least about 0.05 mol % $Na_2O$, at least about 10 mol % $Na_2O$, or at least about 13 mol % $Na_2O$. Additionally, or alternatively, the first glass composition comprises at most about 16 mol % $Na_2O$, at most about 14 mol % $Na_2O$, at most about 2 mol % $Na_2O$, or at most about 0.1 mol % $Na_2O$. Additionally, or alternatively, the first glass composition comprises at least about 0.01 mol % $K_2O$, at least about 2 mol % $K_2O$, or at least about 8 mol % $K_2O$. Additionally, or alternatively, the first glass composition comprises at most about 15 mol % $K_2O$, at most about 9 mol % $K_2O$, at most about 6 mol % $K_2O$, or at most about 0.1 mol % $K_2O$.

In some embodiments, first glass composition 215 comprises an alkaline earth oxide selected from the group consisting of MgO, CaO, SrO, BaO, and combinations thereof. For example, the first glass composition comprises at least about 1 mol % MgO, at least about 2 mol % MgO, at least about 3 mol % MgO, or at least about 4 mol % MgO. Additionally, or alternatively, the first glass composition comprises at most about 8 mol % MgO, at most about 4 mol % MgO, or at most about 3 mol % MgO. Additionally, or alternatively, the first glass composition comprises at least about 0.01 mol % CaO, at least about 2 mol % CaO, at least about 4 mol % CaO, at least about 5 mol % CaO, or at least about 6 mol % CaO. Additionally, or alternatively, the first glass composition comprises at most about 8 mol % CaO, at most about 7 mol CaO, or at most about 0.1 mol % CaO. Additionally, or alternatively, the first glass composition comprises at least about 3 mol % SrO, at least about 4 mol SrO, at least about 5 mol % SrO, or at least about 6 mol % SrO. Additionally, or alternatively, the first glass composition comprises at most about 7 mol % SrO, at most about 6 mol % SrO, or at most about 5 mol % SrO. Additionally, or alternatively, the first glass composition comprises at least about 0.01 mol % BaO, at least about 0.02 mol % BaO, or at least about 0.07 mol % BaO. Additionally, or alternatively, the first glass composition comprises at most about 0.1 mol % BaO, at most about 0.09 mol % BaO, or at most about 0.05 mol BaO.

In some embodiments, first glass composition 215 comprises one or more additional components including, for example $SnO_2$, $Sb_2O_3$, $As_2O_3$, $Ce_2O_3$, Cl (e.g., derived from KCl or NaCl), $ZrO_2$, or $Fe_2O_3$.

In some embodiments, second glass composition 225 comprises a glass network former selected from the group consisting of $SiO_2$, $Al_2O_3$, $B_2O_3$, and combinations thereof. For example, the second glass composition comprises at least about 60 mol % $SiO_2$, at least about 62 mol $SiO_2$, or at least about 67 mol % $SiO_2$. Additionally, or alternatively, the second glass composition comprises at most about 70 mol % $SiO_2$, at most about 68 mol % $SiO_2$, at most about 65 mol % $SiO_2$, or at most about 63 mol % $SiO_2$. Additionally, or alternatively, the second glass composition comprises at least about 6 mol % $Al_2O_3$, at least about 10 mol % $Al_2O_3$, or at least about 12 mol % $Al_2O_3$. Additionally, or alternatively, the second glass composition comprises at most about 18 mol % $Al_2O_3$, at most about 13 mol % $Al_2O_3$, or at most about 8 mol % $Al_2O_3$. Additionally, or alternatively, the second glass composition comprises at least about 4 mol % $B_2O_3$, at least about 6 mol % $B_2O_3$, at least about 9 mol % $B_2O_3$, or at least about 16 mol % $B_2O_3$. Additionally, or alternatively, the second glass composition comprises at most about 25 mol % $B_2O_3$, at most about 21 mol % $B_2O_3$, at most about 18 mol % $B_2O_3$, or at most about 11 mol % $B_2O_3$.

In some embodiments, second glass composition 225 comprises an alkali metal oxide selected from the group consisting of $Li_2O$, $Na_2O$, $K_2O$, and combinations thereof. For example, the second glass composition comprises from about 0 mol % to about 0.1 mol % $Na_2O$, or from about 0 mol % to about 0.06 mol % $Na_2O$. Additionally, or alternatively, the second glass composition comprises from about 0 mol % to about 0.05 mol % $K_2O$, or from about 0 mol % to about 0.03 mol % $K_2O$. In other embodiments, the second glass composition is substantially free of alkali metal. For example, the second glass composition comprises at most about 0.1 mol % alkali metal oxide. In other embodiments, the second glass composition comprises from about 5 mol % to about 10 mol % alkali metal oxide.

In some embodiments, second glass composition 225 comprises an alkaline earth oxide selected from the group consisting of MgO, CaO, SrO, BaO, and combinations thereof. For example, the second glass composition comprises at least about 0.2 mol % MgO, at least about 1 mol % MgO, or at least about 3 mol % MgO. Additionally, or alternatively, the second glass composition comprises at most about 5 mol % MgO, at most about 4 mol % MgO, at most about 2 mol % MgO, or at most about 0.5 mol % MgO. Additionally, or alternatively, the second glass composition comprises at least about 3 mol % CaO, at least about 4 mol % CaO, at least about 5 mol % CaO, or at least about 8 mol % CaO. Additionally, or alternatively, the second glass composition comprises at most about 12 mol % CaO, at most about 9 mol % CaO, at most about 8 mol % CaO, or at most about 5 mol % CaO. Additionally, or alternatively, the second glass composition comprises at least about 0.2 mol SrO, at least about 1 mol % SrO, or at least about 2 mol % SrO. Additionally, or alternatively, the second glass composition comprises at most about 3 mol % SrO, at most about 2 mol % SrO, or at most about 1 mol % SrO. Additionally, or alternatively, the second glass composition comprises at least about 0.01 mol % BaO, at least about 0.02 mol % BaO, or at least about 1 mol % BaO. Additionally, or alternatively, the second glass composition comprises at most about 2 mol % BaO, at most about 0.5 mol % BaO, at most about 0.03 mol % BaO, or at most about 0.02 mol % BaO. In some embodiments, the second glass composition comprises from about 3 mol % to about 16 mol % alkaline earth oxide.

In some embodiments, second glass composition 225 comprises one or more additional components including, for example $SnO_2$, $Sb_2O_3$, $As_2O_3$, $Ce_2O_3$, CI (e.g., derived from KCl or NaCl), $ZrO_2$, or $Fe_2O_3$.

The glass articles described herein can be used for a variety of applications including, for example, for cover glass or glass backplane applications in consumer or commercial electronic devices including, for example, LCD and LED displays, computer monitors, and automated teller machines (ATMs); for touch screen or touch sensor applications, for portable electronic devices including, for example, mobile telephones, personal media players, and tablet computers; for integrated circuit applications including, for example, semiconductor wafers; for photovoltaic applications; for architectural glass applications; for automotive or vehicular glass applications; or for commercial or household appliance applications.

It will be apparent to those skilled in the art that various modifications and variations can be made without departing from the spirit or scope of the invention. Accordingly, the invention is not to be restricted except in light of the attached claims and their equivalents.

What is claimed is:

1. A system comprising:
    a divided delivery tube comprising a plurality of flow channels, the plurality of flow channels comprising:
        a first flow channel bounded by an outer wall of the divided delivery tube and a first dividing wall,
        a second flow channel bounded by the outer wall of the divided delivery tube and a second dividing wall, and
        a third flow channel disposed between the first flow channel and the second flow channel and bounded by the outer wall of the divided delivery tube, the first dividing wall, and the second dividing wall; and
    an overflow distributor comprising a trough;
    wherein the divided delivery tube is fluidly coupled to the trough of the overflow distributor.

2. The system of claim 1, comprising an inlet tube, the divided delivery tube fluidly coupled to the trough of the overflow distributor via the inlet tube.

3. The system of claim 2, wherein the inlet tube comprises an undivided lumen therein.

4. The system of claim 1, comprising:
a first melting system; and
a second melting system;
wherein each of the first melting system and the second melting system is fluidly coupled to the divided delivery tube.

5. The system of claim 4, comprising a delivery vessel, the first melting system fluidly coupled to the divided delivery tube via the delivery vessel.

6. The system of claim 5, wherein the first melting system comprises a first fining vessel and a first mixing vessel.

7. The system of claim 4, comprising a delivery vessel, the second melting system fluidly coupled to the divided delivery tube via the delivery vessel.

8. The system of claim 7, wherein the second melting system comprises a second fining vessel and a second mixing vessel.

9. The system of claim 1, wherein each of the plurality of flow channels corresponds to a determined transverse position relative to a width of a glass sheet formed using the system and a determined axial position relative to a thickness of the glass sheet.

10. The system of claim 1, wherein the trough of the overflow distributor is bounded by opposing first and second sidewalls, an upper edge of the first sidewall comprising a first weir, and an upper edge of the second sidewall comprising a second weir.

11. The system of claim 1, wherein a bottom surface of the trough of the overflow distributor is contoured such that a height of the trough decreases in a transverse direction away from an inlet of the overflow distributor.

12. The system of claim 1, wherein the overflow distributor comprises opposing first and second outer forming surfaces that converge at a draw line.

13. The system of claim 1, wherein the overflow distributor is pivotally adjustable.

14. The system of claim 1, wherein a cross-section of the third flow channel comprises an almond-shaped portion and a wedge-shaped portion extending from the almond-shaped portion.

15. The system of claim 1, comprising:
a first melting system fluidly coupled to each of the first flow channel and the second flow channel; and
a second melting system fluidly coupled to the third flow channel.

16. The system of claim 15, wherein a ratio of a capacity of the first melting system to a capacity of the second melting system is substantially equal to a ratio of a cross-sectional area of the first and second flow channels to a cross-sectional area of the third flow channel.

* * * * *

UNITED STATES PATENT AND TRADEMARK OFFICE
CERTIFICATE OF CORRECTION

PATENT NO. : 10,377,654 B2
APPLICATION NO. : 16/116254
DATED : August 13, 2019
INVENTOR(S) : Steven Howard Tarcza et al.

Page 1 of 1

It is certified that error appears in the above-identified patent and that said Letters Patent is hereby corrected as shown below:

On the Title Page

Column 2, item (57), Abstract, Line 2, delete "cross section" and insert -- cross-section --, therefor.

Column 2, item (57), Abstract, Line 3, delete "cross sectional" and insert -- cross-sectional --, therefor.

Column 2, item (57), Abstract, Line 4, delete "cross sectional" and insert -- cross-sectional --, therefor.

Column 2, item (57), Abstract, Lines 4-5, delete "cross sectional" and insert -- cross-sectional --, therefor.

Column 2, item (57), Abstract, Line 6, delete "cross sectional" and insert -- cross-sectional --, therefor.

Signed and Sealed this
Thirty-first Day of December, 2019

Andrei Iancu
*Director of the United States Patent and Trademark Office*